March 31, 1936. W. A. MENDELSOHN ET AL 2,036,181
GLAROMETER
Filed Aug. 12, 1931 2 Sheets-Sheet 1
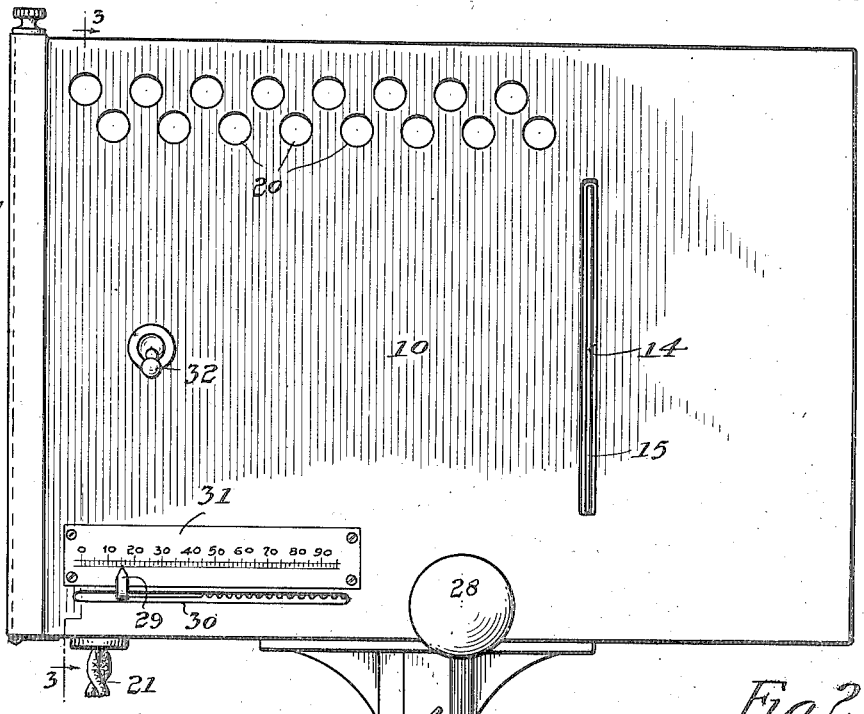
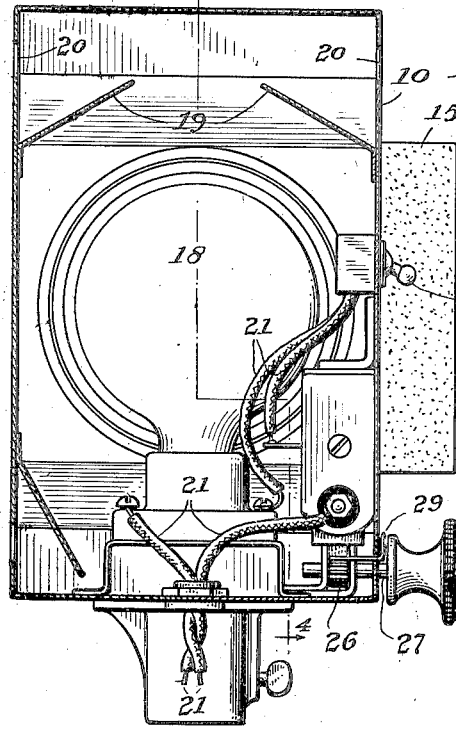
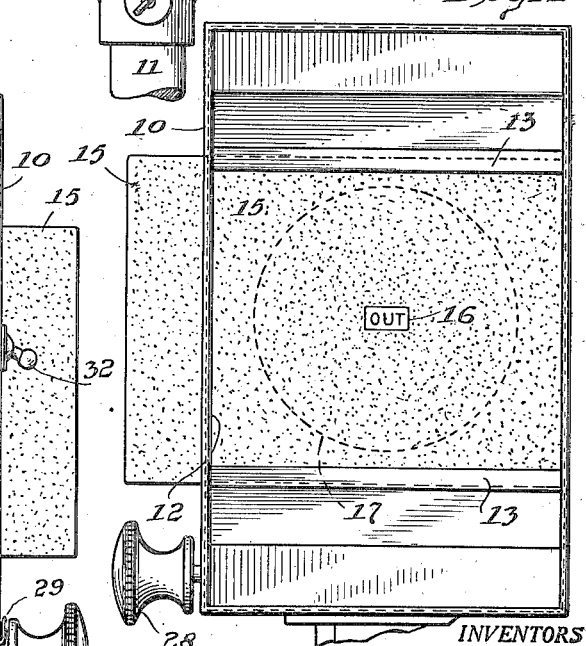
INVENTORS
William A. Mendelsohn
BY Carl F. Shepard
Brayton Richards ATTORNEY.

March 31, 1936. W. A. MENDELSOHN ET AL 2,036,181
GLAROMETER
Filed Aug. 12, 1931 2 Sheets-Sheet 2

INVENTORS
William A. Mendelsohn
BY Carl F. Shepard
Brayton & Richards ATTORNEY.

Patented Mar. 31, 1936

2,036,181

UNITED STATES PATENT OFFICE 2,036,181

GLAROMETER

William Arthur Mendelsohn and Carl F. Shepard, Chicago, Ill., assignors, by mesne assignments, to Soft-Lite Lens Company, Inc., a corporation of New York Application August 12, 1931, Serial No. 556,496

2 Claims. (Cl. 88—20)

The invention relates to a certain new and improved glarometer especially adapted and arranged for the testing of human eyes to indicate accurately the effect of a bright or glaring light thereon, and which is of simple construction and highly efficient in use.

Other objects will appear hereinafter.

The invention consists in the combinations and arrangements of parts hereinafter described and claimed.

The invention will be best understood by reference to the accompanying drawings forming a part of this specification, and in which Fig. 1 is a side view of an instrument embodying the invention;

Fig. 2 a front view of the same;

Fig. 3 a transverse section taken substantially on line 3—3 of Fig. 1;.

Figure 4:
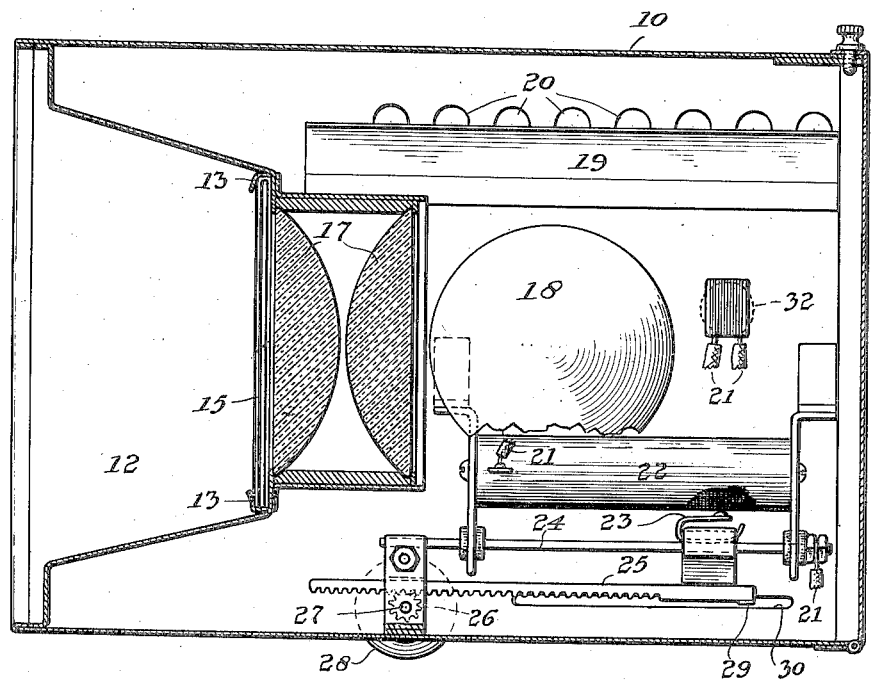

Fig. 4 a horizontal section of the same; and

Figure 5:
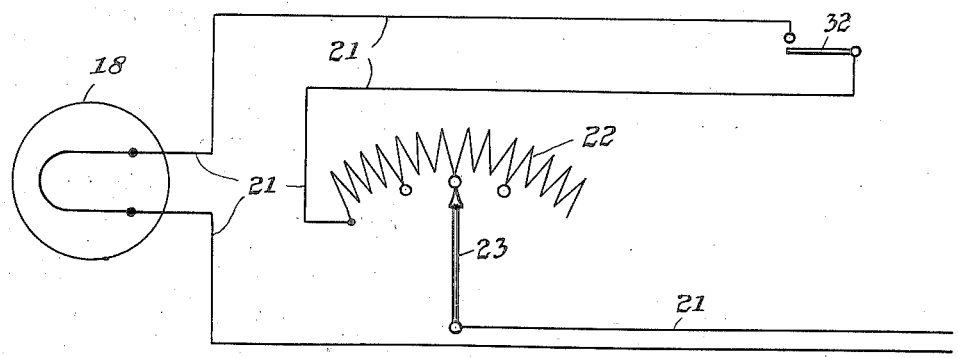

Fig. 5 a diagrammatic view of the electric circuit employed in the instrument.

The embodiment of the invention illustrated in the drawings comprises a suitable casing or enclosure 10 mounted upon a suitable pedestal or support 11 and having a recess 12 formed, as shown in Fig. 4, in its front end. Arranged at the inner end of the recess 12 are top and bottom transverse guides 13 arranged in registration with an entry slot 14 in the side of the casing 10 and whereby a translucent screen 15, preferably of ground or frosted glass, may be readily inserted in said guides as and when desired.

The screen 15 is provided with a distinctive mark 16, located substantially at the central portion thereof. Two similar lenses 17 are arranged as shown in the casing 10 immediately to the rear of the screen 15. As shown, these lenses are plano-convex in form and arranged with their curved surfaces adjacent each other.

Arranged also in the casing 10, immediately to the rear of the lenses 17, is an electric light bulb 18, having deflectors 19 positioned above it and ventilating openings 20 in the sides of the casing 10, as shown. An electric circuit is provided for the light 18 by means of the wires 21, said circuit including a variable resistance 22, as indicated. Associated with the variable resistance 22 is a spring contact 23 slidable on a connecting bar 24. Movements of the contact 23 are controlled by means of a rack bar 25 meshing with a pinion 26 on an operating shaft 27 carrying an operating knob or wheel 28 and whereby the contact 23 may be readily adjusted with relation to the resistance 22 to vary the intensity of the light 18. The rack bar 25 carries an indicator finger 29 operating through a slot 30 in the corresponding side of the casing 10 and cooperating with a scale 31, by means of which the resistance, and therefore the intensity of the light emitted, will be readily indicated and registered on the outside of the casing 10. A suitable switch 32 is also provided for the light circuit 21 for controlling the same.

In use, for testing the eyes of a patient, the patient looks at the screen 15 with one or both eyes, while the light emanating from the bulb 18 is increased until the glare thereof causes the patient to lose sight of the central mark 16 on the screen. The intensity of the light thus required will be indicated on the scale 31 and will thus furnish a means whereby colored glasses of proper color and tint may be readily prescribed to protect the eyes of the patient from injurious effects from sun or other too strong or glaring light. Obviously screens of various degrees of translucency or opaqueness, and of various colors and tints, may be employed, as the judgment and skill of the operator dictate.

The arrangement disclosed is such that the central area of the screen is illuminated by reflected light only, whereas the surrounding area is illuminated by direct variable light from the bulb 18 and so that the glare from the surrounding area will, when bright enough, demonstrate the capacity of the patient to distinguish a mark in the central area.

While we have illustrated and described the preferred form of construction for carrying our invention into effect, this is capable of variation and modification without departing from the spirit of the invention. We, therefore, do not wish to be limited to the precise details disclosed, but desire to avail ourselves of such variations and modifications as fall within the scope of the appended claims.

Having thus fully described our invention, what we claim as new and desire to secure by Letters Patent is:

1. An instrument for testing human eyes comprising a casing having a sight recess in the front portion thereof; a translucent screen at the inner end of said recess, having a distinctive mark at the central portion thereof; two plano-convex lenses arranged immediately behind said screen with their convex sides facing each other; an electric light within said casing behind said lenses; an electric circuit for said light; a variable resistance in said light circuit; and an indicator for indicating variations in said resistance.

2. An instrument for testing human eyes comprising a translucent screen having a distinctive mark at the central portion thereof; means for positioning said screen in front of the eyes to be tested; two plano-convex lenses arranged immediately at the other side of said screen with their convex sides facing each other; an electric light also arranged at said other side of said screen; and means for varying the intensity of said light.

WM. ARTHUR MENDELSOHN.
CARL F. SHEPARD.